United States Patent
Parnin

(10) Patent No.: US 11,428,163 B2
(45) Date of Patent: Aug. 30, 2022

(54) TWO TIER LUBRICATION SYSTEM

(71) Applicant: UNITED TECHNOLOGIES CORPORATION, Farmington, CT (US)

(72) Inventor: Francis Parnin, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 816 days.

(21) Appl. No.: 16/224,093

(22) Filed: Dec. 18, 2018

(65) Prior Publication Data

US 2020/0191054 A1   Jun. 18, 2020

(51) Int. Cl.
| | | |
|---|---|---|
| F02C 7/06 | (2006.01) | |
| F01D 25/20 | (2006.01) | |
| F01M 1/20 | (2006.01) | |
| F01M 11/06 | (2006.01) | |

(52) U.S. Cl.
CPC ............... *F02C 7/06* (2013.01); *F01D 25/20* (2013.01); *F01M 1/20* (2013.01); *F01M 11/067* (2013.01); *F05D 2220/323* (2013.01); *F05D 2260/98* (2013.01); *F05D 2270/301* (2013.01)

(58) Field of Classification Search
CPC .. F02C 7/06; F01D 25/20; F01M 1/20; F01M 11/067; F05D 2220/323; F05D 2260/98; F05D 2270/301
See application file for complete search history.

(56) References Cited

U.S. PATENT DOCUMENTS

| | | | | |
|---|---|---|---|---|
| 4,431,372 A | * | 2/1984 | Dadhich | ................. F01D 25/20 184/27.2 |
| 4,976,335 A | * | 12/1990 | Cappellato | ................ F16N 7/40 184/6.4 |
| 5,836,421 A | * | 11/1998 | Leicht | .................... F01M 5/025 184/6.2 |
| 6,886,324 B1 | * | 5/2005 | Handshuh | ............... F01D 25/20 60/39.08 |
| 7,905,325 B1 | * | 3/2011 | Wedlake | ................... F02C 7/06 184/6.11 |
| 8,230,974 B2 | | 7/2012 | Parnin | |
| 8,978,829 B2 | | 3/2015 | McCune et al. | |
| 9,410,448 B2 | | 8/2016 | Sheridan et al. | |
| 9,976,444 B2 | | 5/2018 | NguyenLoc et al. | |
| 10,030,580 B2 | * | 7/2018 | Ethier | ..................... F02C 7/264 |
| 10,072,521 B2 | | 9/2018 | Mastro et al. | |

(Continued)

FOREIGN PATENT DOCUMENTS

| | | |
|---|---|---|
| CA | 495599 | 8/1953 |
| EP | 3109414 | 12/2016 |

OTHER PUBLICATIONS

European Patent Office, European Search Report dated Apr. 22, 2020 in Application No. 19203223.3.

*Primary Examiner* — Michael R Mansen
*Assistant Examiner* — Mark K Buse
(74) *Attorney, Agent, or Firm* — Snell & Wilmer L.L.P.

(57) ABSTRACT

A two-tier lubrication system may comprise an oil nozzle located in a bearing compartment. A main oil system may be configured to provide oil to the oil nozzle. A scavenge system may be configured to collect oil from the bearing compartment. A valve may be fluidly coupled between the main oil system and the scavenge system. The valve may be configured to actuate between a main flow position and a scavenge flow position.

19 Claims, 5 Drawing Sheets

(56) References Cited

U.S. PATENT DOCUMENTS

| | | | |
|---|---|---|---|
| 2005/0039433 A1* | 2/2005 | Nakano | F01D 25/20 60/39.08 |
| 2008/0006483 A1* | 1/2008 | Parnin | F01D 25/20 184/6 |
| 2013/0192252 A1* | 8/2013 | Ackermann | F02C 7/06 60/782 |
| 2015/0096839 A1* | 4/2015 | Craig | F02C 7/06 184/6.1 |
| 2016/0032770 A1* | 2/2016 | Sheridan | B01D 19/0068 60/39.08 |
| 2016/0169144 A1* | 6/2016 | Surnilla | F02D 35/027 123/435 |
| 2016/0245117 A1* | 8/2016 | Parnin | F01M 1/10 |
| 2016/0312699 A1* | 10/2016 | Teicholz | F02C 7/06 |
| 2016/0376949 A1* | 12/2016 | Parnin | F01D 25/18 73/112.01 |
| 2018/0283211 A1 | 10/2018 | Parnin et al. | |
| 2019/0178119 A1* | 6/2019 | Karcher | F16H 57/0471 |
| 2019/0301479 A1* | 10/2019 | Ngoly | F15B 1/024 |
| 2020/0149430 A1* | 5/2020 | Cornet | F02C 7/06 |

* cited by examiner

TWO TIER LUBRICATION SYSTEM

STATEMENT OF GOVERNMENT INTEREST

This invention was made with Government support awarded by the United States. The Government has certain rights in this invention.

FIELD

The present disclosure relates to aircraft propulsion systems, and more particularly, to a two-tier lubrication system for use with such systems.

BACKGROUND

Jet aircraft propulsion systems, such as those that power modern commercial and military aircraft, include a variety of rotating components. These rotating components are typically lubricated by one or more types of oil. Lubricating oil may be supplied to each component by an oil supply tube. Similarly, lubricating oil may be recovered or "scavenged" by an oil scavenge tube. Conventional oil system configurations can lose oil pressure when exposed to extreme flight attitudes or maneuvers that result in low or negative gravity ("G") conditions. The loss of pressure is generally caused by the oil in the main oil reservoir moving away from the oil reservoir outlet along with the inability of the engine oil sumps to scavenge and return oil to the reservoir. Brief interruptions (for example, 10 seconds or less) of oil flow are generally acceptable for most rotating mechanical components of the engine. However, extended exposure and/or repeated brief exposures to oil interruption can cause reduced component durability or failure. Additionally, some engine components may not withstand even brief (e.g., 5 to 10 seconds) of oil interruption.

SUMMARY

A two-tier lubrication system is disclosed herein. In accordance with various embodiments, the two-tier lubrication system may comprise a main oil reservoir and an oil nozzle located in a bearing compartment. A scavenge system may be configured to collect oil from the bearing compartment. A main oil pump may be configured to pump oil from the main oil reservoir. A boost pump may be located downstream from the main oil pump and configured to pump oil to the oil nozzle. A valve may be upstream from the boost pump and fluidly coupled between the main oil pump and the scavenge system. The valve may be configured to actuate between a main flow position and a scavenge flow position.

In various embodiments, in the main flow position, the oil from the main oil reservoir may be provided to the oil nozzle and the oil collected by the scavenge system is directed to the main oil reservoir. In the scavenge flow position, the oil collected by the scavenge system may be provided to the oil nozzle.

In various embodiments, the scavenge system may comprise a deaerator. In various embodiments, a reserve oil accumulator may be fluidly coupled to the scavenge system. In various embodiments, the reserve oil accumulator may comprise a piston accumulator.

In various embodiments, the valve may be configured to actuate to the scavenge flow position in response to a pressure in the scavenge system exceeding a pressure generated by the oil from the main oil reservoir. In various embodiments, the valve may be configured to actuate to the scavenge flow position in response to a pressure generated by the oil from the main oil reservoir being less than a threshold pressure.

In various embodiments, the two-tier lubrication system may further comprise a valve assembly including the valve and an electromechanical actuator configured to actuate the valve between the scavenge flow position and the main flow position. A controller may be in operable communication with the electromechanical actuator. In various embodiments, the controller may be configured to receive flight data and command the electromechanical actuator to actuate the valve based upon the flight data.

A gas turbine engine is also disclosed herein. In accordance with various embodiments, the gas turbine engine may comprise a rotating component located in a bearing compartment, and a two-tier lubrication system configured to provide a lubricating fluid to the rotating component. The two-tier lubrication system may comprise an oil nozzle located in the bearing compartment, a main oil system configured to provide oil to the oil nozzle, a scavenge system configured to collect oil from the bearing compartment, a valve fluidly coupled between the main oil system and the scavenge system, wherein the valve is configured to actuate between a main flow position and a scavenge flow position, and a boost pump located downstream of the valve and configured to pump the lubricating fluid to the oil nozzle.

In various embodiments, in the main flow position, the lubricating fluid may comprise the oil processed through the main oil system, and in the scavenge flow position, the lubricating fluid may comprise the oil collected by the scavenge system. In the scavenge flow position, the oil collected by the scavenge system may bypass processing through the main oil system.

In various embodiments, the scavenge system of the two-tier lubrication system may comprise a deaerator. In various embodiments, the two-tier lubrication system may further comprise a reserve oil accumulator fluidly coupled to the scavenge system.

In various embodiments, the valve may be configured to actuate to the scavenge flow position in response to a pressure in the scavenge system exceeding a pressure in the main oil system. In various embodiments, the valve may be configured to actuate to the scavenge flow position in response to a pressure in the main oil system being less than a threshold pressure.

In various embodiments, the two-tier lubrication system may comprise a valve assembly including the valve and an electromechanical actuator configured to actuate the valve between the scavenge flow position and the main flow position. A controller may be in operable communication with the electromechanical actuator. The controller may be configured to command the electromechanical actuator to actuate the valve based upon flight data received by the controller.

A two-tier lubrication system for a gas turbine engine is also disclosed herein. In accordance with various embodiments, the two-tier lubrication system may comprise an oil nozzle located in a bearing compartment, a main oil system configured to provide oil to the oil nozzle, and a scavenge system configured to collect oil from the bearing compartment. A valve may be fluidly coupled between the main oil system and the scavenge system. The valve may be configured to actuate between a main flow position and a scavenge flow position.

In various embodiments, in the main flow position, the oil from the main oil system may be directed to the oil nozzle and the oil collected by the scavenge system may be directed to a main oil reservoir. In the scavenge flow position, the oil collected by the scavenge system may be directed to the oil nozzle.

In various embodiments, the valve may be configured to actuate to the scavenge flow position in response to at least one of a pressure in the scavenge system exceeding a pressure in the main oil system or the pressure in the main oil system being less than a threshold pressure.

In various embodiments, the two-tier lubrication system may comprise a valve assembly including the valve and an electromechanical actuator configured to actuate the valve between the scavenge flow position and the main flow position. A controller may be in operable communication with the electromechanical actuator.

In various embodiments, a boost pump may be downstream of the valve. In various embodiments, a reserve oil accumulator may be fluidly coupled to the scavenge system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Disclosed herein is a two-tier lubrication system configured to provide oil to interruption-sensitive gas turbine engine components (i.e., to components that may be damaged by any interruption in oil supply). In accordance with various embodiments, the two-tier lubrication system may include a shuttle valve configured to direct oil flow from a scavenge system to the interruption-sensitive components during instances of main oil system interruption. In various embodiments, a deaerator may be located between the scavenge system pump and the shuttle valve. In various embodiments, the two-tier lubrication system may include a reserve oil accumulator configured to provide additional oil volume to the scavenge system and compensate for oil which has become unavailable from the main oil system. Accordingly, a two-tier lubrication system, as disclosed herein, can protect interruption-sensitive gas turbine engine components from damage and extend allowable operation time in extreme flight attitudes and maneuvers.

Figure 1:
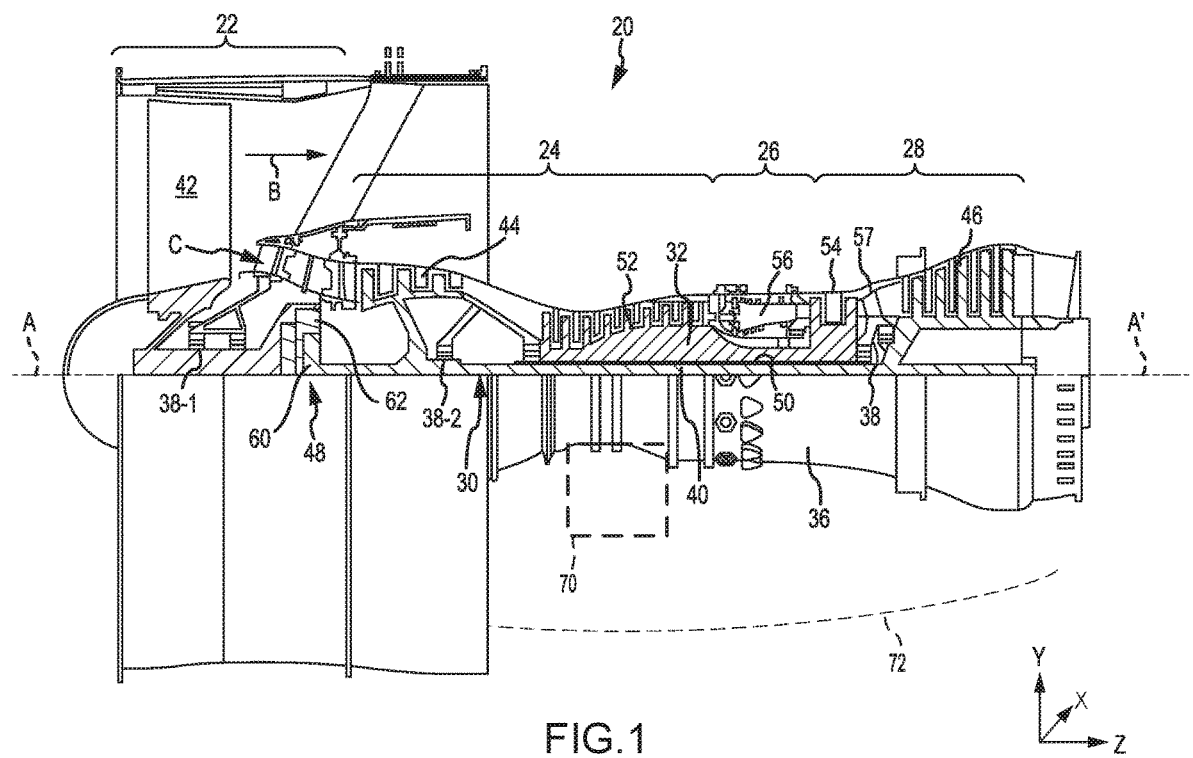
FIG. 1 illustrates a cross-sectional view of an exemplary gas turbine engine, in accordance with various embodiments.

With reference to FIG. 1, a gas turbine engine 20 is disclosed. Gas turbine engine 20 may comprise a two-spool turbofan that generally incorporates a fan section 22, a compressor section 24, a combustor section 26, and a turbine section 28. In operation, fan section 22 may drive air along a bypass flow-path B, while compressor section 24 may further drive air along a core flow-path C for compression and communication into combustor section 26, before expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

In various embodiments, gas turbine engine 20 may comprise a low speed spool 30 and a high speed spool 32 mounted for rotation about an engine central longitudinal axis A-A' relative to an engine static structure 36 via one or more bearing systems 38 (shown as, for example, bearing system 38-1 and bearing system 38-2 in FIG. 1). Engine central longitudinal axis A-A' is oriented in the z direction (axial direction) on the provided xyz axes. It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

In various embodiments, the air along core flow-path C may be compressed by low pressure compressor 44 and high pressure compressor 52, mixed and burned with fuel in combustor 56, and expanded over high pressure turbine 54 and low pressure turbine 46. Low pressure turbine 46 and high pressure turbine 54 may rotationally drive low speed spool 30 and high speed spool 32, respectively, in response to the expansion. A gearbox 70 may be coupled to and/or supported by engine static structure 36. A core nacelle 72 may be arranged about the engine static structure 36 and may enclose gearbox 70. Gearbox 70 may house or otherwise support various accessory gearbox components (for example, hydraulic pumps, oil pumps, fuel pumps, generators, permanent magnet alternators) which may be driven by one or more gear trains.

Figure 2:
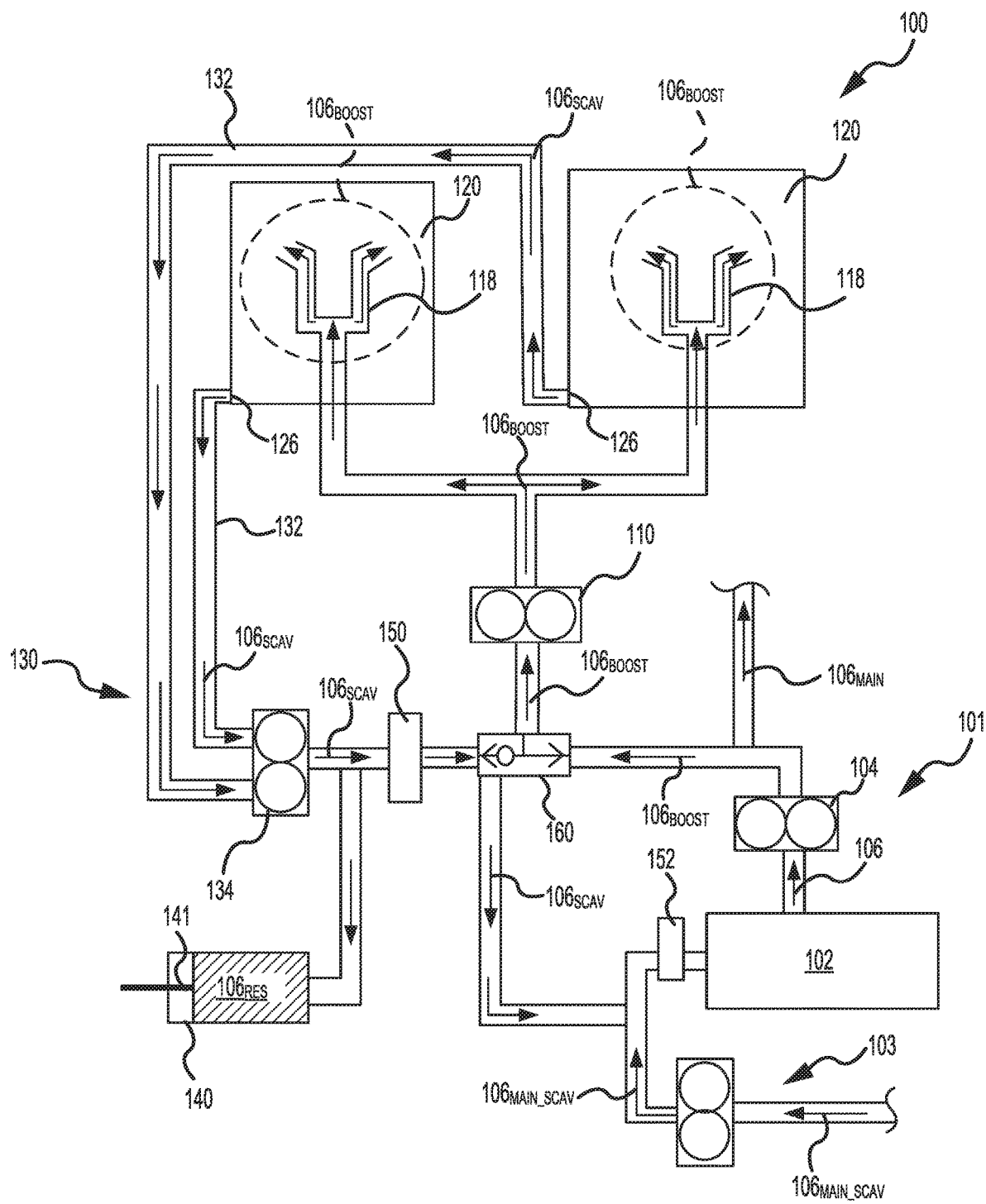
FIG. 2 illustrates a schematic diagram of a two-tier lubrication system during normal operation, in accordance with various embodiments.

With reference to FIG. 2, a two-tier lubrication system 100 is shown, in accordance with various embodiments. Two-tier lubrication system 100 may provide lubricating fluid (e.g., oil) to components in various bearing compartments in gas turbine engine 20 in FIG. 1. For example, with momentary combined reference to FIGS. 1 and 2, two-tier lubrication system 100 may provide oil to gear meshes, oil seals, or any other lubricated component in bearing systems 38, 38-1, and 38-2, and/or in accessory gearbox 70.

Two-tier lubrication system 100 includes a first tier that provides oil to the components of gas turbine engine 20 during normal operating conditions, and a second tier that provides oil to the interruption-sensitive components of gas turbine engine 20 (i.e., to components that may be damaged by any interruption in oil supply) during abnormal pressure events. Stated differently, the first tier is configured to provide oil to both interruption-sensitive components and interruption-tolerant components of gas turbine engine 20, while the second tier is configured to provide oil to just the interruption-sensitive components during abnormal pressure events and/or at times when the main oil system may not be able to provide oil to either the interruption-sensitive components or the interruption-tolerant components. In various embodiments, the interruption-sensitive components may comprise, for example, one or more a wet face seal(s) and/or journal bearing(s), and the interruption-tolerant components may comprise one or more rolling element bearing(s). While exemplar interruption-sensitive and interruption-tolerant components are referenced, the disclosure contemplates, generally, interruption-sensitive components to include any component that is intolerant to interruptions to the supply of lubrication fluid and interruption-tolerant components to include any component that is not intolerant to interruptions to the supply of lubrication fluid.

In accordance with various embodiments, the first tier comprises a main oil system 101. Main oil system 101 includes a main oil reservoir 102 and a main oil pump 104. Main oil pump 104 is configured to pump oil 106 from main oil reservoir 102 to various bearing compartments of gas turbine engine 20. A boost pump 110 is located downstream from main oil pump 104. As used in the previous contest, "downstream" refers to a flow direction away from main oil reservoir. Stated differently, main pump 104 is located between boost pump 110 and main oil reserve 102. Boost pump 110 may be configured to pump oil to oil nozzles 118 located in bearing compartments 120 of gas turbine engine 20. Oil nozzles 118 spray, or otherwise provide, oil to lubricate the components rotating within bearing compartments 120. Oil supplied to bearing compartments 120 may also cool the static walls of bearing compartments 120. Bearing compartments 120 may include interruption-sensitive components of gas turbine engine 20, for example, bearing compartments 120 may include a wet face carbon seal, a journal bearing, and/or other interruption-sensitive components. In other words, the components within bearing compartments 120 may be susceptible to damage if they experience even a brief interruption (e.g., an interruption of less than 10 seconds) in oil supply.

Two-tier lubrication system 100 includes a scavenge system 130. Scavenge system 130 is configured to collect oil from bearing compartments 120. In this regard, during operation of the gas turbine engine, oil output from oil nozzles 118 may accumulate at, or otherwise flow toward, a drainage outlet 126 in each of the bearing compartments 120. A scavenge pump 134 of scavenge system 130 may draw the accumulated oil through scavenge tubes 132 fluidly coupled to drainage outlet 126. Thus, scavenge system 130 may collect oil by scavenge pump 134 drawing the oil from the bearing compartments 120 through scavenge tubes 132 coupled to drainage outlets 126 of the bearing compartments. In various embodiments, a portion of the oil collected by scavenge system 130 may be provided to a reserve oil accumulator 140. While one scavenge pump 134 is illustrated, it is further contemplated and understood that scavenge pump 134 may include one or more individual pump stages, with each pump stage dedicated to an individual bearing compartment 120.

Scavenge system 130 includes one or more scavenge tubes 132 fluidly coupled at the drainage outlet 126 of each bearing compartments 120. Oil may enter the bearing compartments 120 to lubricate the components rotating within the bearing compartment 120 and exit the bearing compartment 120 at drainage outlet 126. Scavenge pump 134 is coupled to scavenge tubes 132 and pumps the oil through scavenge system 130. For example, as discussed in further detail below, during normal operation, the oil collected by scavenge system 130 may be pumped to main oil reservoir 102, and during an abnormal pressure event, the oil collected by scavenge system 130 may bypass main oil system 101 (i.e., bypass main oil reservoir 102 and main oil pump 104) and be pumped to oil nozzles 118.

In accordance with various embodiments, two-tier lubrication system 100 includes a valve 160 configured to regulate the flow of oil to boost pump 110 and bearing compartments 120. Valve 160 is fluidly coupled between scavenge system 130 and main oil pump 104. Valve 160 is configured to provide either the oil provided by main oil pump 104 or the oil from scavenge system 130 to boost pump 110 and bearing compartments 120. In various embodiments, valve 160 may be a shuttle valve.

In various embodiments, during normal operation, valve 160 is in a first or "main flow" position that causes the oil output from main oil pump 104 to flow to boost pump 110 and bearing compartments 120. When valve 160 is in the main flow position, the oil in scavenge system 130 may be blocked, or otherwise prevented, from flowing to boost pump 110 and bearing compartments 120, thereby causing the scavenge oil to be returned to main oil reservoir 102. During an abnormal pressure event, for example during a maneuver that results in a low or negative gravity, valve 160 may actuate to a second or "scavenge flow" position that causes the oil in scavenge system 130 to flow to boost pump 110 and bearing compartments 120. In the scavenge flow position, the oil in scavenge system 130 bypasses processing through main oil reservoir 102 and main oil system 101. In various embodiments, valve 160 may be configured to actuate between the main flow position and the scavenge flow position in response to changes in pressure and/or in oil flow rate. For example, valve 160 may be configured to actuate to the main flow position (FIG. 2) when the pressure of the oil flow in main oil system 101 (i.e., the pressure generated by the flow provided by main oil pump 104) exceeds the pressure of the flow from scavenge system 130, and to actuate to the scavenge flow position (FIG. 3) when the pressure generated by the flow from scavenge system 130 exceeds the pressure of the flow in main oil system 101. In various embodiments, valve 160 may be configured to actuate to the scavenge flow position, if the oil pressure in main oil system 101 drops below a predetermined threshold pressure. The predetermined threshold pressure may be selected to avoid interruption in oil flow or to reduce a length of interruption in oil flow to the interruption-sensitive components in bearing compartments 120.

Figure 5:
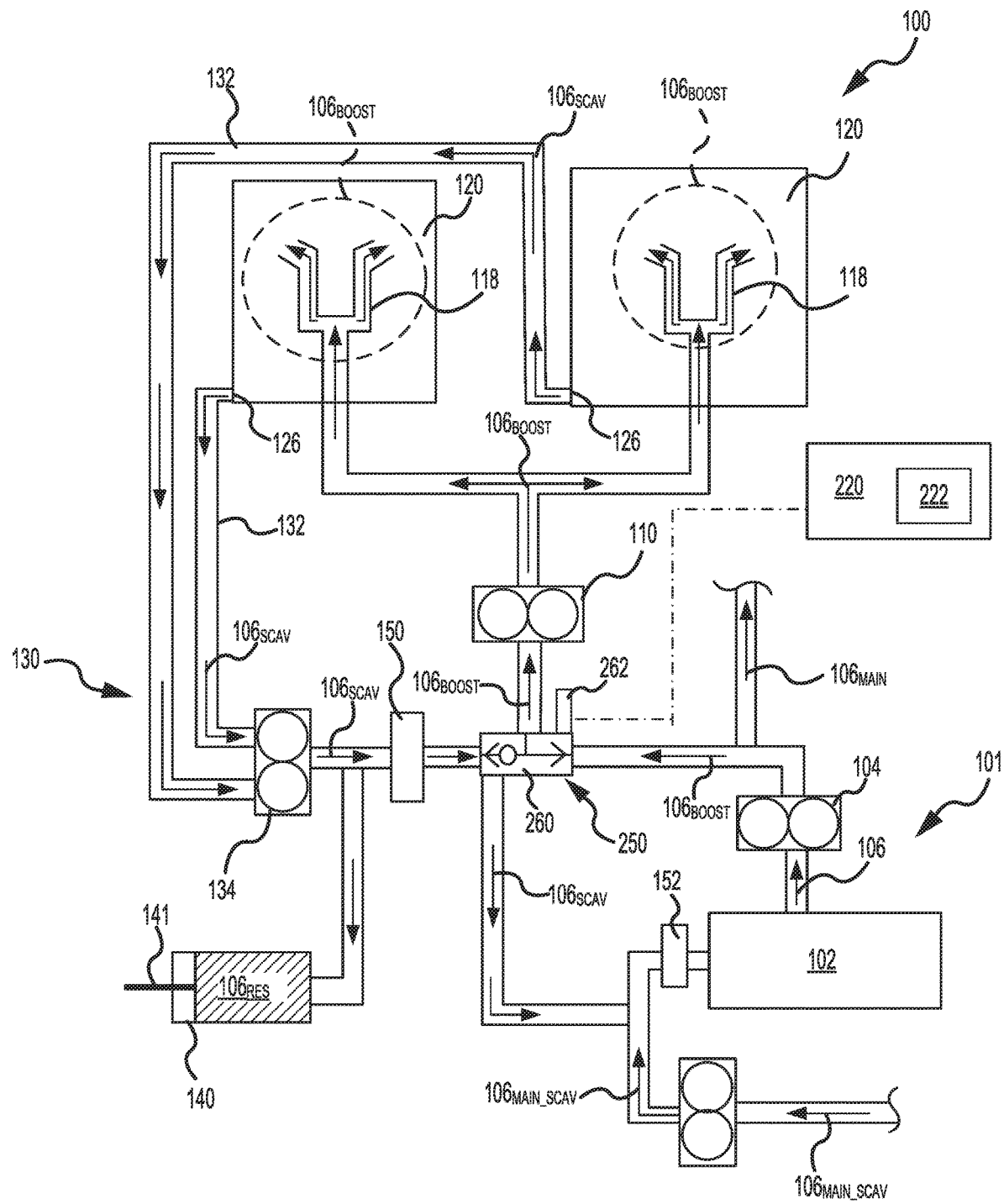
FIG. 5 illustrates a schematic diagram of a two-tier lubrication system during normal operating conditions and having an electromechanically controlled valve, in accordance with various embodiments.

In various embodiments, with momentary reference to FIG. 5, two-tier lubrication system 100 may include a valve assembly 250 in place of valve 160 in FIG. 2. Valve assembly 250 may include a valve 260 configured to regulate the flow of oil from main oil system 101 and scavenge system 130 to boost pump 110 and bearing compartments 120. In this regard, valve 260 is configured to translate between the main flow position and the scavenge flow position. In the main flow position, the oil processed in main oil system 101 flows to boost pump 110 and bearing compartments 120. In the scavenge flow position, the oil in scavenge system 130 flows to boost pump 110 and bearing compartments 120. In the scavenge flow position, the oil in scavenge system (i.e., scavenge oil $106_{SCAV}$) bypasses processing through main oil reservoir 102 and main oil system 101. Valve assembly 250 further includes an electromechanical actuator (EMA) 262 operably coupled to valve 260 and configured to translate valve 260 between the main flow position and the scavenge flow position. EMA 262 is operably coupled to a controller 220. Controller 220 may be configured to command EMA 262 to actuate valve 260 to either the main flow position or the scavenge flow position. In various embodiments, controller 220 may determine whether valve 260 should be in the scavenge position or in the main flow position based on flight data received by controller 220. Controller 220 may receive flight data from sensors coupled to gas turbine engine 20, from an avionics unit, and/or from any other suitable flight data source. For example, controller 220 may command EMA 262 to actuate valve 260 to the scavenge flow position in response to an attitude signal exceeding a particular threshold, or in response to an output from a yaw detection sensor indicating a negative yaw, and/or in response to receiving a signal indicating the oil pressure in main oil system 101 has dropped below a predetermined threshold pressure. The predetermined threshold pressure may be selected to avoid interruption in oil flow or to reduce a length of interruption in oil flow to the interruption-sensitive components in bearing compartments 120.

In various embodiments, controller 220 may comprise a full authority digital engine control (FADEC) system. Controller 220 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. Controller 220 may include a memory 222. Memory 222 may store executable instructions and data to implement control logic of controller 220. Memory 222 may comprise a non-transitory, tangible computer-readable medium having instructions stored thereon that, in response to execution by controller 220, cause controller 220 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Returning to FIG. 2, the flow of oil through two-tier lubrication system 100 is shown during normal operation. In accordance with various embodiments, during normal operation, main oil pump 104 draws oil 106 from main oil reservoir 102. Boost pump 110 draws, at least, a portion of the oil 106 pumped from main oil reservoir 102 and provides this portion (referred to herein as boost oil $106_{BOOST}$) to oil nozzles 118. Oil nozzles 118 use boost oil $106_{BOOST}$ to lubricate the interruption-sensitive components in bearing compartments 120. In various embodiments, at least, a portion $106_{MAIN}$ of the oil 106 from main oil reservoir 102 is provided to interruption-tolerant components of gas turbine engine 20 (i.e., components that can withstand oil interruptions of longer than 10 seconds).

Scavenge system 130 collects unused or runoff oil (referred to herein as scavenge oil $106_{SCAV}$) from bearing compartments 120 via drainage outlet 126. In this regard, scavenge pump 134 draws scavenge oil $106_{SCAV}$ through scavenge tubes 132. In various embodiments, scavenge system 130 may include a reserve oil accumulator 140. A portion of scavenge oil $106_{SCAV}$ may be provided to reserve oil accumulator 140 to create a supply of reserve oil $106_{RES}$ within reserve oil accumulator 140. In various embodiments, reserve oil accumulator 140 comprises a piston accumulator. Reserve oil accumulator 140 may be configured to hold reserve oil $106_{RES}$ under pressure applied by a biasing force 141. Biasing force 141 may be, for example, a spring, compressed gas, air muscle, or any other suitable biasing force. Scavenge system 130 and reserve oil accumulator 140 may be configured such that during normal operation, the pressure generated by the oil flow in scavenge system 130 will exceed the pressure generated by biasing force 141 of reserve oil accumulator 140. During normal operation, scavenge oil will flow into reserve oil accumulator 140 until reserve oil accumulator 140 is filled to capacity and/or until the pressure of the reserve oil accumulator 140 (i.e., the pressure applied by the biasing force 141) is equal to the oil pressure in scavenge system 130. As discussed in further detail below, reserve oil accumulator 140 may provide reserve oil $106_{RES}$ to scavenge system 130 if the pressure of reserve oil accumulator 140 (i.e., the pressure applied by the biasing force 141) exceeds the oil pressure in scavenge system 130.

Scavenge system 130 is fluidly coupled to valve 160. Valve 160 may control the flow of scavenge oil $106_{SCAV}$. During normal operation (i.e., in the main flow position), valve 160 may block or otherwise prevent scavenge oil $106_{SCAV}$ from flowing to bearing compartments and/or may cause scavenge oil $106_{SCAV}$ to flow to main oil reservoir 102. Stated differently, during normal operation, main oil pump 104 continuously provides boost oil $106_{BOOST}$ to bearing compartments 120, thereby allowing scavenge oil $106_{SCAV}$ to flow into and replenish main oil reservoir 102. Main oil reservoir 102 may also receive scavenge oil $106_{MAIN\_SCAV}$ collected from scavenge tubes outside of scavenge system 130 (e.g., from scavenge tubes that collect oil from interruption-tolerant components of gas turbine engine 20 and/or from scavenge tubes that do not provide oil to interruption-sensitive components during abnormal pressure events). In this regard, during normal operation, main oil reservoir 102 may receive both scavenge oil $106_{SCAV}$ and scavenge oil $106_{MAIN\_SCAV}$. In various embodiments, a main deaerator 152 may be located in or near main oil reservoir 102. Main deaerator 152 may remove the air from oil within and/or from oil entering main oil reservoir 102.

In various embodiments, scavenge system 130 may include a supplemental deaerator 150. Supplemental deaerator 150 may be located upstream of valve 160. As used in the previous contest, "upstream" refers to a flow direction away from valve 160 and toward drainage outlet 126 (i.e., in a direction opposite the direction scavenge oil $106_{SCAV}$ is flowing). Stated differently, supplemental deaerator 150 may be located between drainage outlet 126 and valve 160 such that scavenge oil $106_{SCAV}$ will flow from drainage outlet 126 to supplemental deaerator 150 and from supplemental deaerator 150 to valve 160. Supplemental deaerator 150 is configured to remove the air from scavenge oil $106_{SCAV}$ in scavenge system 130.

Figure 3:
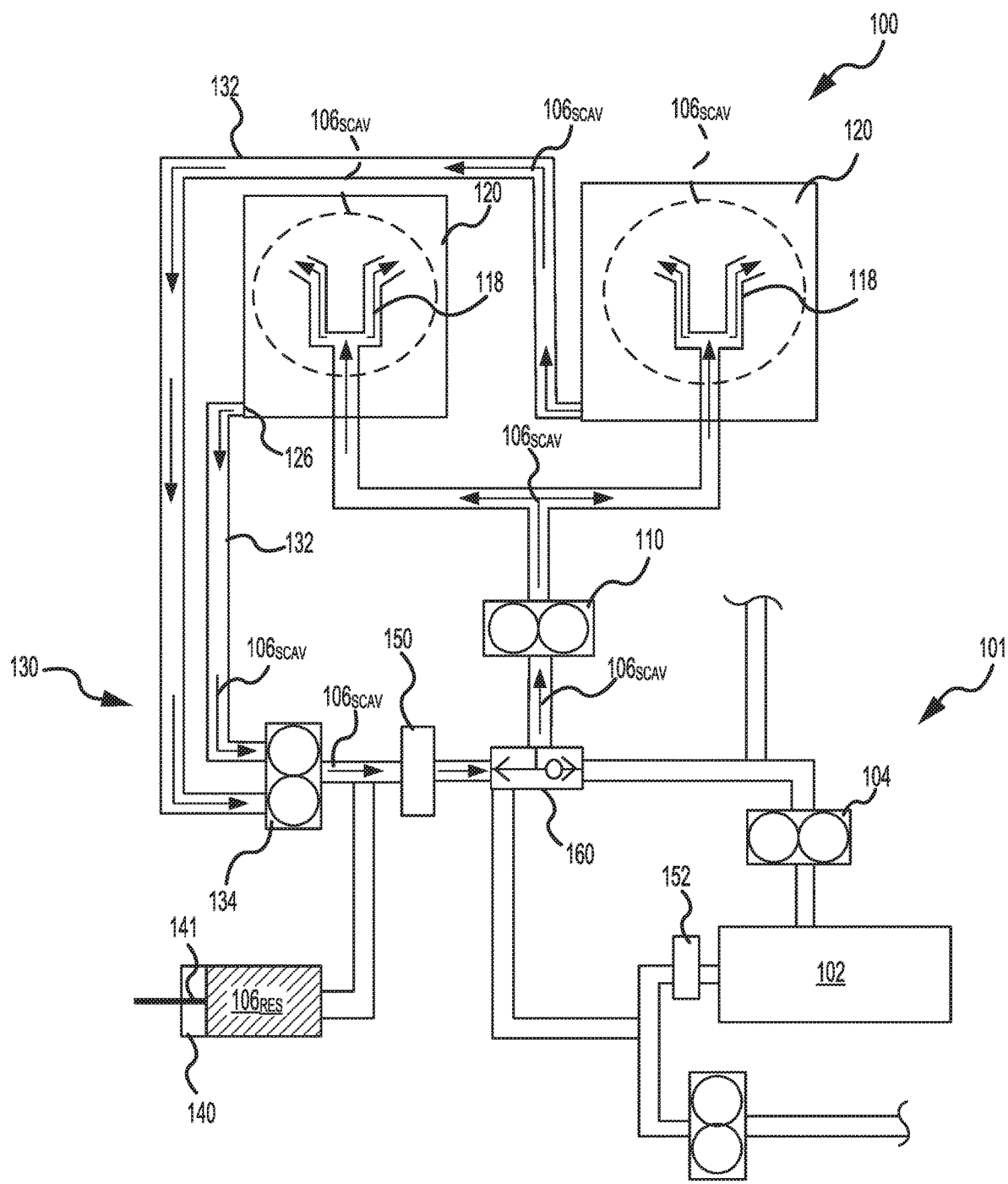
FIG. 3 illustrates a schematic diagram of a two-tier lubrication system during an abnormal pressure event, in accordance with various embodiments.

With reference to FIG. 3, the flow of oil through two-tier lubrication system 100 during an abnormal pressure event is illustrated, in accordance with various embodiments. During an abnormal pressure event, main oil pump 104 may be unable to draw oil from main oil reservoir 102, thereby causing valve 160 to translate to the scavenge flow position. With valve 160 in the scavenge flow position, scavenge oil $106_{SCAV}$ is drawn by boost pump 110 and provided to oil nozzles 118. Oil nozzles 118 use scavenge oil $106_{SCAV}$ to lubricate the interruption-sensitive components in bearing compartments 120. Scavenge system 130 then collects the unused or runoff scavenge oil $106_{SCAV}$ at outlets 126 and recycles scavenge oil $106_{SCAV}$ back into bearing compartments 120. Valve 160 may remain in the scavenge flow position, and thus scavenge system 130 may continue recycling scavenge oil $106_{SCAV}$ into bearing compartments 120, until main oil pump 104 is able to again supply oil from main oil reservoir 102 to valve 160. For example, valve 160 may remain in the scavenge flow position until the pressure and/or flow rate of oil provided by main oil pump 104 exceeds the pressure and/or flow rate of scavenge oil $106_{SCAV}$. Directing scavenge oil $106_{SCAV}$ into bearing compartments 120, as opposed to into main oil reservoir 102, may prevent oil interruption or reduce a length of oil interruption in bearing compartments 120 during an abnormal pressure event.

Figure 4:
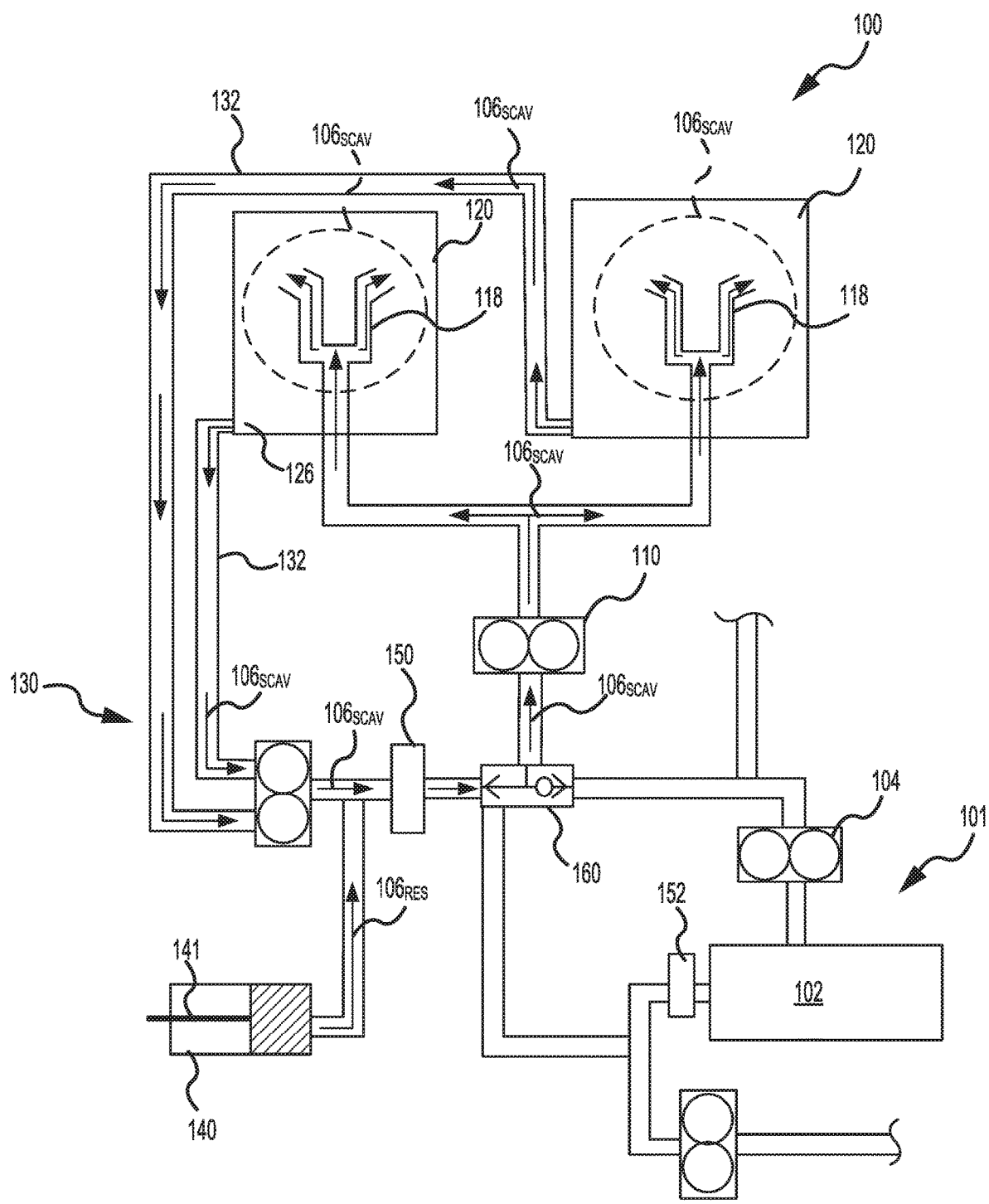
FIG. 4 illustrates a schematic diagram of a two-tier lubrication system during an abnormal pressure event with a reserve oil accumulator providing lubricating oil to an oil scavenge system, in accordance with various embodiments.

With reference to FIG. 4, a flow of oil through two-tier lubrication system 100 during an abnormal pressure event with reserve oil accumulator 140 providing lubricating oil to scavenge system 130 is illustrated, in accordance with various embodiments. As scavenge system 130 continues to provide scavenge oil $106_{SCAV}$ to bearing compartments 120, a volume of scavenge oil $106_{SCAV}$ in scavenge system 130 may decrease, thereby causing the pressure and/or flow rate of scavenge oil $106_{SCAV}$ to decrease. Reserve oil accumulator 140 is configured to provide reserve oil $106_{RES}$ to scavenge system 130, if the pressure in scavenge system 130 drops below the pressure of reserve oil accumulator 140. For example, when the pressure generated by biasing force 141 is greater than the oil pressure in scavenge system 130 reserve oil $106_{RES}$ will flow into scavenge system 130.

Reserve oil $106_{RES}$ will flow into scavenge system 130 until the oil pressure in scavenge system 130 is equal to the pressure of the reserve oil accumulator 140 (i.e., the pressure applied by the biasing force 141) or until reserve oil accumulator 140 is emptied of reserve oil $106_{RES}$. When the pressure in scavenge system 130 begins exceeding the pressure applied by the biasing force 141, for example, once normal operation is restored and oil from main system 101 is provided to bearing compartments 120, scavenge oil $106_{SCAV}$ will to flow into reserve oil accumulator 140 to replenish the supply of reserve oil $106_{RES}$. The size of reserve oil accumulator 140 may be determined based on the efficiency of scavenge system 130 and the flow rate of boost pump 110. In this regard, as an efficiency of scavenge system 130 is increased (i.e., as the percentage of oil recovered from bearing compartments 120 increases) the size of reserve oil accumulator 140 may be decreased.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A two-tier lubrication system, comprising:
    a main oil reservoir;
    an oil nozzle located in a bearing compartment;
    a scavenge system configured to collect oil from the bearing compartment;
    a main oil pump configured to pump oil from the main oil reservoir;
    a boost pump located downstream from the main oil pump and configured to pump oil to the oil nozzle; and
    a valve upstream from the boost pump and fluidly coupled between the main oil pump and the scavenge system, wherein the valve is configured to actuate between a main flow position and a scavenge flow position, and wherein in the main flow position the oil from the main oil reservoir is output by the valve and provided to the boost pump and the oil collected by the scavenge system is directed to the main oil reservoir, and wherein in the scavenge flow position the oil collected by the scavenge system is output by the valve to the boost pump.

2. The two-tier lubrication system of claim 1, wherein in the main flow position the boost pump pumps the oil from the main oil reservoir to the oil nozzle and wherein in the scavenge flow position the boost pump pumps the oil collected by the scavenge system to the oil nozzle.

3. The two-tier lubrication system of claim 1, wherein the scavenge system comprises a supplemental deaerator.

4. The two-tier lubrication system of claim 1, further comprising a reserve oil accumulator fluidly coupled to the scavenge system.

5. The two-tier lubrication system of claim 4, wherein the reserve oil accumulator comprises a piston accumulator.

6. The two-tier lubrication system of claim 1, wherein the valve is configured to actuate to the scavenge flow position in response to a pressure in the scavenge system exceeding a pressure generated by the oil from the main oil reservoir.

7. The two-tier lubrication system of claim 1, wherein the valve is configured to actuate to the scavenge flow position in response to a pressure generated by the oil from the main oil reservoir being less than a threshold pressure.

8. The two-tier lubrication system of claim 1, further comprising:
    a valve assembly including the valve and an electromechanical actuator configured to actuate the valve between the scavenge flow position and the main flow position; and
    a controller in operable communication with the electromechanical actuator, wherein the controller is configured to receive flight data, and wherein the controller is configured to command the electromechanical actuator to actuate the valve based upon the flight data.

9. A gas turbine engine, comprising:
    a rotating component located in a bearing compartment; and
    a two-tier lubrication system configured to provide a lubricating fluid to the rotating component, the two-tier lubrication system comprising:
        an oil nozzle located in the bearing compartment,
        a main oil system configured to provide the lubricating fluid to the oil nozzle,
        a scavenge system configured to collect the lubricating fluid from the bearing compartment,
        a valve fluidly coupled between the main oil system and the scavenge system, wherein the valve is configured to actuate between a main flow position and a scavenge flow position, wherein in the main flow position the lubricating fluid in the main oil system is output by the valve and provided to a boost pump, and wherein in the scavenge flow position the lubricating fluid collected by the scavenge system is output by the valve to a boost pump, and and
        the boost pump located downstream of the valve and configured to pump the lubricating fluid that is output from the valve to the oil nozzle.

10. The gas turbine engine of claim 9, wherein in the scavenge flow position the lubricating fluid collected by the scavenge system bypasses processing through the main oil system.

11. The gas turbine engine of claim 10, wherein the two-tier lubrication system further comprises a reserve oil accumulator fluidly coupled to the scavenge system.

12. The gas turbine engine of claim 10, wherein the valve is configured to actuate to the scavenge flow position in response to a pressure in the main oil system being less than a threshold pressure.

13. The gas turbine engine of claim 10, wherein the two-tier lubrication system further comprises:
    a valve assembly including the valve and an electromechanical actuator configured to actuate the valve between the scavenge flow position and the main flow position; and
    a controller in operable communication with the electromechanical actuator, wherein the controller is configured to command the electromechanical actuator to actuate the valve based upon flight data received by the controller.

14. The gas turbine engine of claim 9, wherein the valve is configured to actuate to the scavenge flow position in response to a pressure in the scavenge system exceeding a pressure in the main oil system.

15. A two-tier lubrication system for a gas turbine engine, comprising:
    an oil nozzle located in a bearing compartment;
    a main oil system configured to provide oil to the oil nozzle;
    a scavenge system configured to collect oil from the bearing compartment; and
    a valve fluidly coupled between the main oil system and the scavenge system, wherein the valve is configured to actuate between a main flow position and a scavenge flow position, and wherein the valve is configured to actuate to the scavenge flow position in response to a pressure in the scavenge system exceeding a pressure in the main oil system.

16. The two-tier lubrication system of claim 15, wherein in the main flow position the oil from the main oil system is directed to the oil nozzle and the oil collected by the scavenge system is directed to a main oil reservoir, and wherein the in the scavenge flow position the oil collected by the scavenge system is directed to the oil nozzle.

17. The two-tier lubrication system of claim 15, further comprising:
- a valve assembly including the valve and an electromechanical actuator configured to actuate the valve between the scavenge flow position and the main flow position; and
- a controller in operable communication with the electromechanical actuator.

18. The two-tier lubrication system of claim 15, further comprising a boost pump downstream of the valve.

19. The two-tier lubrication system of claim 15, further comprising a reserve oil accumulator fluidly coupled to the scavenge system.

* * * * *